June 25, 1968 F. PLASSER ETAL 3,389,469

MOBILE TRACK CORRECTION APPARATUS

Filed June 8, 1966

INVENTORS:
FRANZ PLASSER
JOSEF THEURER

BY Kurt Kelman
AGENT

United States Patent Office 3,389,469

Patented June 25, 1968

3,389,469
MOBILE TRACK CORRECTION APPARATUS

Franz Plasser and Josef Theurer, both of Johannesgasse 3, Vienna, Austria

Filed June 8, 1966, Ser. No. 556,003
Claims priority, application Austria, July 5, 1965, A 6,104/65
9 Claims. (Cl. 33—1)

ABSTRACT OF THE DISCLOSURE

The movement of a track section during a lining or grading operation in relation to a reference is visibly recorded on a traveling chart moving synchronously with the forward movement of the track correction apparatus.

Figures 1, 4, 5:
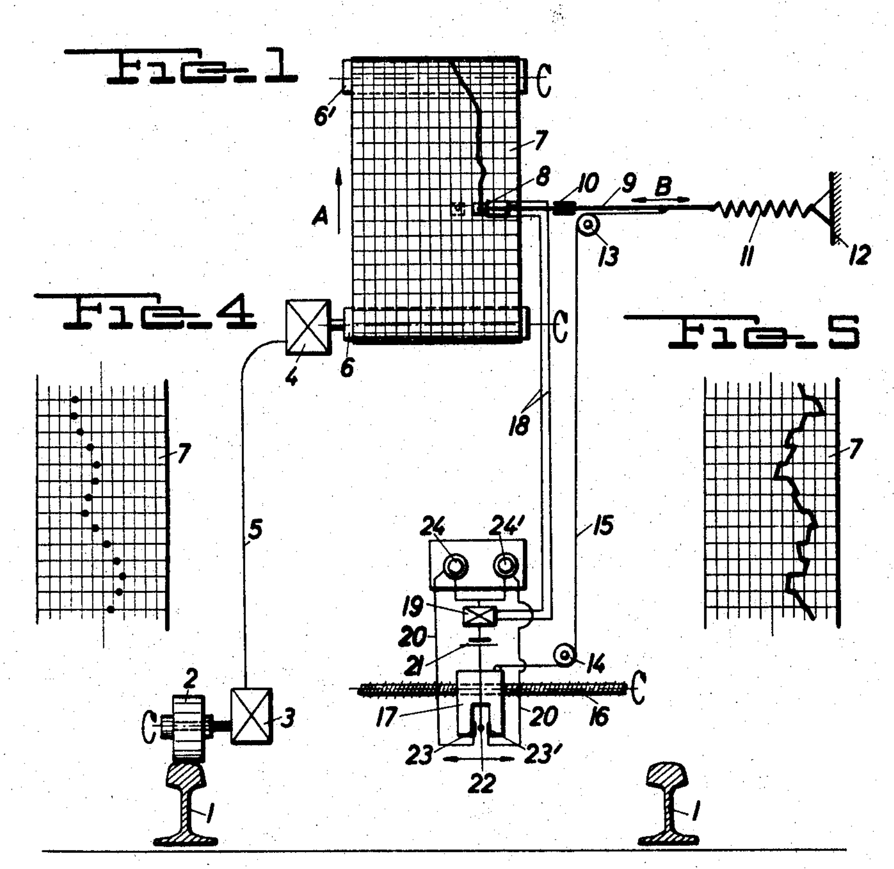

The present invention relates to mobile track correction apparatus for continuously correcting the position of a track section as the apparatus advances along the track. Track liners or track grading machines of this general type are well known. Useful track liners have been disclosed, for instance, in U.S. Patents Nos. 3,126,633, 3,165,838, and 3,314,373. Mobile track grading machines are shown, for example, in U.S. Patents Nos. 3,192,870 and 3,211,109.

It is a primary object of this invention to provide such an apparatus with a system which records the individual corrections effectuated in a given track section so that, after the correction has been completed, a clear picture of the corrected track position is obtained and it is possible to ascertain whether or not the corrected position is in accordance with the desired position. Thus, if the corrected position deviates at any point from the desired position, it is possible to return to such a point immediately after the work on any given section has been completed and promptly to correct the track position at this point again.

This and other objects and advantages are accomplished in accordance with the invention by equipping a mobile track correction apparatus, which carries the conventional track of aligning and/or lifting tools, also with a traveling chart which moves synchronously with the forward movement of the apparatus on the track, a movable track position recording element associated with the traveling chart, and means for moving the recording element in respect of the traveling chart in response to a respective corrected track position. The chart is moved in respect of the recording element and thus carries a record of a corrected track section produced by the recording element on the chart during the correction of the track section.

Since the track correction recording system is mounted on a track correction apparatus in accordance with the present invention, it not only indicates the corrected position at each point as the correction is effectuated and also gives a total picture of a corrected track section, it makes it possible immediately to correct any occurring correction error as the correction work proceeds or to return the apparatus to an incorrectly aligned or graded track point to correct the track positon there in accordance with the synchronous record on the traveling chart, the chart moving backwards and forward in synchronism with the movement of the apparatus on the track.

Many variations in recording the track position on the traveling chart are possible within the scope of this invention. For instance, the recording element may be in constant contact with the chart so that a continuous line is recorded on the chart. However, usually only the final track position and its relation to the desired position is of interest, for instance in the lateral alignment of track curves the length of ordinates at successive points of the curve. Therefore, in a preferred embodiment of the invention, means is provided which enables the recording element to produce a record, i.e., a dot or a perforation, on the traveling chart only when any point on the track section has attained the corrected position.

According to another preferred feature of this invention, a reference line constituted by a tensioned wire is provided in respect of which the track is to be corrected, and a sensing element is associated with the reference wire. The sensing element is movable transversely of the direction of movement of the traveling chart, and means connects the recording element to the sensing element for moving the recording element in the same direction as the sensing element.

Figures 2, 3:
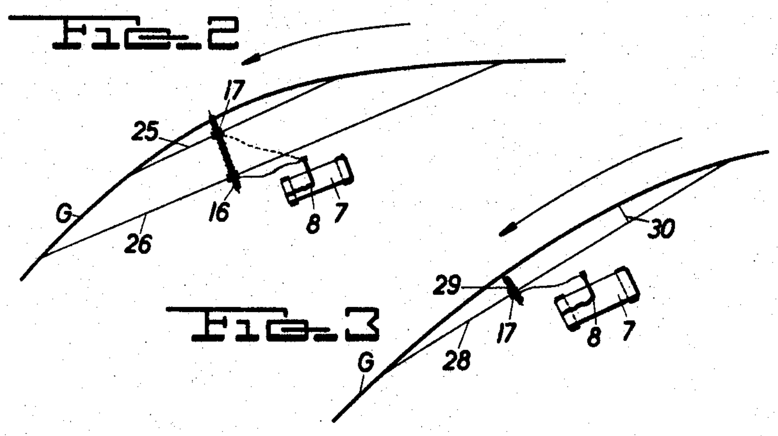

The above and other objects, advantageous and features of the present invention will become better understood by reference to the following detailed description of certain preferred embodiments thereof, taken in conjunction with the accompanying drawing wherein:

FIG. 1 schematically illustrates the essential parts of an apparatus designed to record the track position and including an element associated with the reference line to sense the track position;

FIGS. 2 and 3 schematically show the apparatus of this invention in two different applications; and FIGS. 4 and 5 illustrate respective embodiments of recording the track position.

Referring first to FIG. 1 showing only as much of an otherwise conventional mobile track correction apparatus as is pertinent to the present invention, the track to be corrected, i.e., to be laterally aligned or vertically graded, is shown to include a pair of rails 1, 1 on which the track correction apparatus moves continuously to correct the track position in relation to a reference line constituted in the illustrated embodiment by a tensioned wire 22. Various types of such mobile track correction apparatus are well known to those skilled in the art, and a description thereof is not required for an understanding of this invention. Such track correction apparatus includes a machine frame, which is indicated at 12, carrying track correction tools.

A roll 2 is freely rotatably journaled on the machine frame and is arranged to engage one of the rails 1 to be rotated by its frictional engagement with the rail as the track correction apparatus moves along the track. To avoid relative slippage between the rail and the roll, the latter is preferably made of hard rubber or like material and it is pressed downwardly against the rail to assure proper engagement. In this manner, the roll 2 accurately meters the distance traveled by the apparatus.

The rotation of the metering roll 2 is transmitted to the driven capstan 6 of a traveling chart 7 by means of a motion transmitting train including gears 3 and 4 interconnected by flexible shaft 5. The chart 10 is an endless band mounted on driven capstan 6 and freely rotatable support roller 6', and will move synchronously with the movement of the track correction apparatus, i.e., at a speed equal or proportional to the speed of rotation of metering roll 2.

A recording element 8, which is constituted by a stylus or recording pen in FIG. 1, cooperates with the traveling chart 10. The recording element is so associated with the chart that it is movable transversely of the direction of movement of the chart (see arrow A). For this purpose, the recording element is mounted on a rod 9 which glides for reciprocating movement in the directions of arrow B in a guide 10. One end of the rod 9 is connected to the frame 12 of the apparatus by means of a return spring 11 to bias the rod in one direction.

An elongated flexible element 15, which is illustrated as a rope or wire in FIG. 1, has one end attached to rod 9 while its other end is attached to an element 17 which senses the track position. In the illustrated embodiment, the sensing element 17 is a two-pronged contact fork straddling the reference wire 22. The sensing element is transversely movably mounted on the rotatable spindle 16, internal screw threads in elements 17 engaging the screw threads of spindle 16 so that the sensing element will move upon rotation of the spindle in one or the other direction transversely of the direction of movement of chart 7, depending on the direction of rotation of the spindle. Flexible element 15 is guided over pulleys 13, 14 so that, in cooperation with return spring 11, element 15 will move rod 9 in the same direction as the direction of movement of sensing element 17.

In the illustrated embodiment, the recording element 8 will make a record on traveling chart 7 only when the electrical circuit 18 produces an electrical pulse, either by opening or closing the circuit. Electrical current is supplied to circuit 18 by means of a relay 19 which is connected to an electrical circuit consisting of lines 20, 20′. A voltage source 21 is connected to lines 20, 20′ but supplies power thereto only when the electrically conductive reference wire 22 engages either of the electrical contacts 23, 23′ mounted on sensing element 17. Depending on which contact is engaged by the reference wire, line 20 or 20′ receives electric current. This causes indicator means connected to these lines to advise an operator of the apparatus in which lateral direction to move the track to bring it into the desired position, in which the reference wire is in the illustrated position out of engagement with either contact of sensing element 17. In the illustrated embodiment, the track positioning indicator means is a visible device consisting of two differently colored lamps 24, 24′ connected respectively to lines 20, 20′. One of the lamps may be red, for instance, while the other one is green, the red lamp, for example, indicating need for a leftward movement of the track while the green lamp signifies the need for a track correction toward the right.

As is well known to those skilled in the art, the track correction may also be effectuated automatically in response to the closing of contact 20 or 20′.

The operation of the above-described apparatus will partly be self-evident from the description of its structure and will now be summarized for a fuller understanding:

As soon as the mobile track correction apparatus has reached a track section to be aligned and/or graded, spindle 16 is rotated either automatically or manually to position the sensing element 17 so that it corresponds to the desired position of the track indicated by reference line 22. The positioning of the sensing element automatically causes a like positioning of recording element 8. However, in the illustrated embodiment, the recording element does not record on the chart because the electrically conductive reference wire 22 will engage one of the contacts 23, 23′ during the lateral movement of the sensing element.

As soon as the sensing element is in the correct position, track correction may be begun. For instance, if the apparatus is used to correct the curve of a track section, the correct position of the sensing element will correspond to the desired ordinate. At this point, either lamp 24 or lamp 24′ will light up if the reference wire is bent out of its straight line by the sensing element and engages one of the contacts 23, 23′, thus indicating in what lateral direction the track must be moved to assume the right ordinate. The lateral movement of the track is continued until the reference wire extends in a straight line again, out of engagement with either contact of the sensing element. The circuit 20, 20′ may, of course, automatically actuate a lateral track displacement device for moving the track in a manner well known per se. As soon as the sensing element is out of engagement with the reference wire, the track has assumed the correct position determined by reference line 22. At this point, relay 19 actuates circuit 18 (by supplying current or interrupting current supply) to produce an impulse in recording element 8, causing a record, such as a point or a perforation, to be made on chart 7.

As far as the present invention is concerned, it makes no difference how the correct position of the sensing element 17 is obtained. For instance, in the embodiment of FIG. 2, the correct ordinate at any given point of a track curve may be obtained by determining the desired ordinate of a shorter chord 25, serving as a reference line for correcting the position of track G, in relation to the actual ordinate of a much longer chord 26. For this purpose, the lateral adjustment of the sensing element 17 may be obtained automatically in accordance with the teaching of Austrian Patent No. 240,398 by mounting a second sensing element 27 on a portion of the spindle 16, which has a different screw pitch, the sensing element 27 being associated with the longer chord 26 in a manner similar to that of element 17 in relation to the chord 25. If the pitch of one sensing element is in a calculable ratio to that of the other sensing element, which corresponds to the ratio of the lengths of the two chords 25, 26 of unequal length, the sensing element 17 will automatically assume its correct position when the sensing element 27 for the longer chord is moved according to the direction of the chord 26 by rotation of spindle 16.

On the other hand, if only one reference line 28 is used, as shown in FIG. 3, the length of desired ordinate 29 at the point of track G to be corrected may be determined, for instance, by comparison with the actual ordinate 30 of a previously corrected track section point which has the same distance from the end of the chord as that of the point to be corrected. The sensing element is then automatically or manually adjusted at each point to position it at the desired distance from the track rail. Any bending of the reference line caused by such adjustment is then eliminated in the above-indicated manner by moving the track laterally.

If the recording element makes a record on the chart only when the reference line is out of contact with the sensing element, as explained hereinabove, the track position recording on chart 7 will occur in dots whose distance from a zero-line on the chart will indicate the respective ordinates of corrected track curve points. This type of recording is shown in FIG. 4.

On the other hand, a continuous recording line is illustrated in the embodiment of FIG. 5. In this recording, the respective lateral adjustments of the sensing element are characterized by lines extending perpendicularly to the direction of travel of chart 7.

While the present invention has been described and illustrated specifically in connection with the lateral alignment of track, it obviously may be used by simple adaptation in the vertical correction of track wherein track sections are graded by lifting the track in relation to a reference line, in which case the distance of the lifting stroke rather than the lateral ordinate is determined in a manner well known per se.

Equally, specific structural details of such parts as the chart and/or recording element may be varied in any suitable manner, and while specific embodiments of this invention have been described and illustrated, it will be clearly understood that many modifications and variations may occur to those skilled in the art without departing from the spirit and scope of the invention as defined in the appended claims.

What we claim is:

1. A mobile track correcting apparatus comprising:

(a) a traveling chart, (b) means for moving the chart synchronously with the forward movement of the apparatus on the track, (c) a movable track position recording element associated with the traveling chart, the chart being moved in respect of the recording element, and (d) means for moving the recording element in respect of the traveling chart in response to a track position corrected in relation to a reference, whereby the traveling chart carries a record of a corrected track section produced by the recording element on the chart during the correction of the track section position.

2. The mobile track correction apparatus of claim 1, further comprising means enabling the recording element to produce a record on the traveling chart only when any point on the track section has attained the corrected position.

3. The mobile track correction apparatus of claim 2, wherein the reference is an electrically conductive reference wire in relation to which the track is to be corrected, a sensing element is associated with the reference wire, at least one electrical contact is mounted on the sensing element, adjacent the reference wire, the corrected track position being indicated by the electrical contact of the sensing element being out of engagement with the reference wire, and an electrical circuit connects the sensing element contact and the recording element, the electrical circuit being actuated when the electrical contact is out of engagement with the reference wire to operate the recording element and to produce a record on the traveling chart.

4. The mobile track correction apparatus of claim 3, wherein the sensing element is a two-pronged fork straddling the reference wire, each fork prong adjacent the wire carrying one of said contacts.

5. The mobile track correction apparatus of claim 3, further comprising an actuating electrical circuit connected to a source of electrical current and including a relay and said contact, the relay being connected to the first-named electric circuit and supplying the electrical current thereto when the contact is out of engagement with the reference wire.

6. The mobile track correction apparatus of claim 1, wherein the synchronous moving means for the traveling chart includes a freely rotatable roll in engagement with a rail of the track and being rotated upon forward movement of the apparatus on the track, and means for transmitting the rotation of the roll to the chart moving means so that the rotational speed of the roll and the traveling speed of the chart are proportional to each other.

7. The mobile track correction apparatus of claim 6, wherein the traveling chart is a band mounted on and moved by a driven capstan, the roll and the capstan being interconnected for synchronous movement.

8. The mobile track correction apparatus of claim 7, wherein the reference line is a tensioned wire.

9. The mobile track correction apparatus of claim 1, wherein the reference is a reference line in relation to which the track is to be corrected, and a sensing element is associated with the reference line, the sensing element being movable transversely of the direction of movement of the traveling chart, and means connects the recording element to the sensing element for moving the recording element in the same direction as the sensing element.

References Cited

UNITED STATES PATENTS

| | | | |
|---|---|---|---|
| 3,198,135 | 8/1965 | Plasser et al. | 104—7 |
| 3,050,015 | 8/1962 | Talboys | 104—7 |
| 2,832,148 | 4/1958 | Rousse | 33—144 |
| 1,898,159 | 2/1933 | Wishard | 33—144 |
| 1,607,882 | 11/1926 | Engelgav | 33—146 |

FOREIGN PATENTS

| | | |
|---|---|---|
| 1,127,941 | 4/1962 | Germany. |

ARTHUR L. LA POINT, *Primary Examiner.*

R. A. BERTSCH, *Assistant Examiner.*